July 8, 1941.　　　E. C. HULETT　　　2,248,682
CONTAINER
Filed July 6, 1939
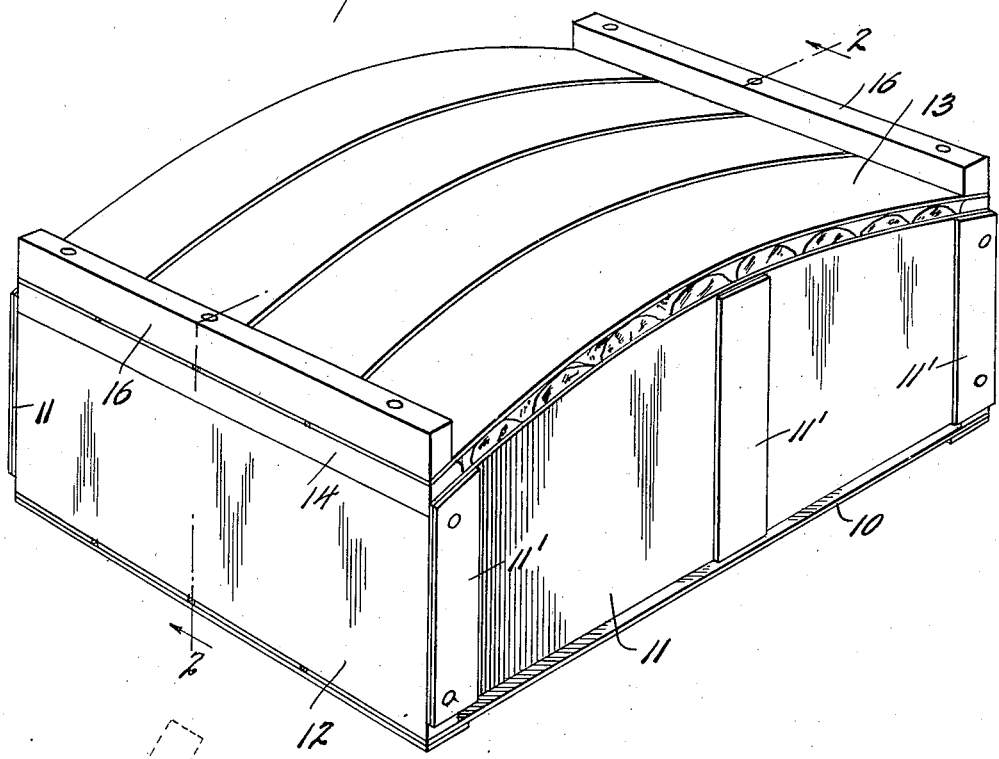
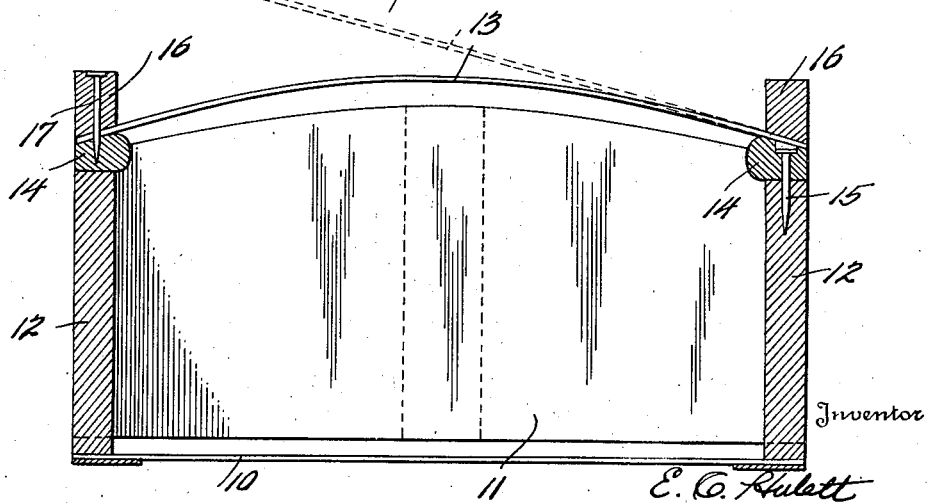

Patented July 8, 1941

2,248,682

UNITED STATES PATENT OFFICE 2,248,682

CONTAINER

Earle C. Hulett, Jacksonville, Fla., assignor to Cummer Sons Cypress Company, Jacksonville, Fla., a corporation of Florida Application July 6, 1939, Serial No. 283,077

1 Claim. (Cl. 217—40)

The present invention relates to containers for fruit or vegetables and comprises an improvement upon the container disclosed in Patent 2,147,340, issued February 14, 1939 to Arthur G. Hague.

The container which comprises the subject matter of the aforementioned patent is a lightweight container fabricated entirely of wood and particularly suitable for use in the storage, transportation and dispensing of perishible commodities such as oranges and tomatoes. Further, the previously patented container is of the "bulge pack" type, the top thereof being upwardly arched from end to end and the sides terminating respectively in curved upper edges which, together with the lateral edges of the top, define longitudinally extending curved ventilation and sight openings intermediate the top and sides of the container. The present container is likewise of the "bulge pack" type, being well suited to contain a body of fruit or vegetables the upper layer of which is upwardly arched from end to end, and resembles in its major features the container disclosed in the aforementioned patent, which patented container has proven to be eminently successful and is used in large quantities in the transportation of perishable fruits and vegetables from producer to consumer. In accordance with the present invention, however, certain improvements are proposed tending to render, when utilized, the container of the aforementioned patent stronger and more rugged, more easily secured or fastened after being packed, and more readily and satisfactorily assembled with other containers in vehicles such as freight cars and trucks, for transportation.

In the accompanying drawing one form of the container is shown and this embodiment of the invention will now be described. It will be understood, however, that minor changes in the design and arrangement of the component parts of the invention may be made without departure therefrom.

In the drawing:

Figure 1 is a perspective view of the improved container after having been packed and the top secured thereto; and Figure 2 is a longitudinal vertical section through the container, the contents not having been illustrated, however, and the top being shown in two positions by means of full and dotted lines, being shown in partially assembled position in dotted lines and fully assembled position in full lines.

The container includes a bottom 10, preferably a lightweight bottom fabricated of slats and battens, side members 11, end members 12, top 13, and transversely extending removable spacing cleats 14 secured to the upper edge surfaces of the end members 12, which are relatively thick and sturdy, as illustrated, by securing devices such for instance as nails 15. The top 13 preferably comprises a plurality of elongated parallel flexible slats secured together at their ends by the top cleats 16. The side members 11 are of lightweight veneer with reinforcing battens such as indicated at 11', the upper edge of each side being curved, as shown, upwardly from the ends to the midpoint thereof. The top 13 is continuously and upwardly arched from one end to the other and the lateral edges of the top are positioned above the upper edges of the side members, the adjacent edges of top and sides thereby defining the margins of two elongated upwardly arched ventilation and inspection apertures extending from end to end of the container.

It will be perceived that the upper surfaces of the top cleats 16 and the lower surfaces of the spacing cleats 14 are disposed in planes parallel to the bottom 10 but that the lower surfaces of the top cleats 16 and the upper surfaces of the spacing cleats 14 are angularly disposed with respect to the bottom 10, being so inclined, respectively, as to have full engagement with the upper and lower surfaces of the end margins of the arched top 13 which lie intermediate the top and spacing cleats. Securing devices such for instance as nails 17 are passed downwardly through the top cleats and top slats after the container has been filled with fruits or vegetables, into the spacing slats 14 in order to secure the top in position.

In the packing of the container it is first filled with fruit or vegetables in such manner that the upper portions of the uppermost layer of fruit or the like are disposed in an arch extending from end to end of the container. One end of the top is then secured in position by securing devices such as shown at 17, the other end being downwardly pressed so that the top is curved as shown in full lines in Figure 2, and until its free end contacts the second spacing cleat 14, whereupon this end also is nailed or otherwise suitably secured in position. In applying the top its undersurface is caused to bear closely upon the upper surface of the top fruit layer. It will be observed that, by reason of the fact that the undersurfaces of the top cleats 16 and the upper surfaces of the spacing cleats 14 are inclined as shown, the top cleats 16 are in precise alignment with the end members 12 and that the end margins of the top are very firmly secured in position. As a result of this arrangement accidental displacement of the top is rendered practically impossible. Further than this, however, the container is more readily stacked, i. e., a plurality of the containers may be packed in a freight car or on a truck in a much more satisfactory manner than heretofore, the parallel bottom and top surfaces of top cleats 16 facilitating this stacking, whether the containers are stacked one upon the other with the bottom of one container resting upon the top cleats of another, or whether wooden strips are positioned intermediate the top of each container and the bottom of the container next above or alongside of it.

Having thus described the invention, what is claimed as new and desired to be secured by Letters Patent is:

A shipping and display container for fruits and vegetables comprising, in combination, and, side, bottom and top members fabricated of wood, two transversely extending spacing cleats mounted on the upper edge surfaces of the end members respectively, said top member being arched in a continuous uninterrupted curve from end to end thereof to provide for a bulge pack, the upper surfaces of said spacing cleats being inclined with respect to the horizontal to substantially conform to the continuous curvature of said top member, the ends of said top member overlying and closely contacting said top surfaces of the spacing cleats, top cleats overlying and closely engaging the end portions of the top member, said top cleats being of a height to permit stacking of the containers one upon the other without interference with the bulge of the top members, and fastening devices securing the cleats and end portions of the top member to the container end members, the bottom surfaces of said top cleats being inclined with respect to the horizontal to substantially conform to the curvature of said top member and the upper surfaces of said top cleats lying in a horizontal plane to facilitate the rapid application of the fastening devices and stacking of the containers, both without injury to the contents.

EARLE C. HULETT.